United States Patent [19]

Tanaka et al.

[11] Patent Number: 5,178,926

[45] Date of Patent: Jan. 12, 1993

[54] HYDROGENATED VINYL AROMATIC HYDROCARBON POLYMER COMPOSITION AND OPTICAL DISC SUBSTRATE

[75] Inventors: Eiji Tanaka, Kawasaki; Satoshi Kato, Machida; Kaoru Sato, Hakodate, all of Japan

[73] Assignee: Mitsubishi Kasei Corporation, Tokyo, Japan

[21] Appl. No.: 851,201

[22] Filed: Mar. 13, 1992

[30] Foreign Application Priority Data

Mar. 18, 1991 [JP] Japan .................. 3-052749

[51] Int. Cl.$^5$ .......................... B32B 3/02; C08L 53/02
[52] U.S. Cl. ........................................ 428/64; 428/65; 428/405; 428/407; 428/473.5; 428/500; 428/908; 524/484; 525/98; 525/99
[58] Field of Search .................. 428/64, 65; 525/98, 525/99

[56] References Cited

U.S. PATENT DOCUMENTS

| | | | |
|---|---|---|---|
| 4,822,653 | 4/1989 | Kauffman et al. | 525/98 |
| 4,911,966 | 3/1990 | Murayama et al. | 428/64 |

FOREIGN PATENT DOCUMENTS

| | | |
|---|---|---|
| 0260454 | 3/1988 | European Pat. Off. . |
| 63-43910 | 2/1988 | Japan . |
| 64-1706 | 1/1989 | Japan . |
| 1-294721 | 11/1989 | Japan . |
| 1-294753 | 11/1989 | Japan . |
| 1-317728 | 12/1989 | Japan . |
| 1-318015 | 12/1989 | Japan . |

OTHER PUBLICATIONS

World Patents Index Latest Week 9126, Derwent Publications Ltd., London, GB; AN 91-188900 Abstract.
JP-A-3 160 051 (Mitsubishi Kasei Corp) Jul. 10, 1991 Abstract.

*Primary Examiner*—Jacob Ziegler
*Attorney, Agent, or Firm*—Oblon, Spivak, McClelland, Maier & Neustadt

[57] ABSTRACT

Disclosed herein are a hydrogenated vinyl aromatic hydrocarbon polymer composition comprising:

(a) 5-90% by weight of a hydrogenated vinyl aromatic hydrocarbon-conjugated diene block copolymer obtained by hydrogenating the substantially whole double bonds derived for the conjugated diene bonds and not less than 60 mol % and less than 80 mol % of an aromatic-ring, the content of the conjugated diene polymer segments in said block copolymer being 1-50 wt %; and (b) 10-95% by weight of a hydrogenated vinyl aromatic hydrocarbon polymer obtained by hydrogenating not less than 60 mol % and less than 80 mol % of an aromatic-ring, and an optical disc substrate molded therefrom.

10 Claims, No Drawings

HYDROGENATED VINYL AROMATIC HYDROCARBON POLYMER COMPOSITION AND OPTICAL DISC SUBSTRATE

BACKGROUND OF THE INVENTION

The present invention relates to a hydrogenated vinyl aromatic hydrocarbon resin composition having excellent transparency, heat resistance and adhesiveness to metals, etc., and an optical disc substrate obtainable by using such a composition.

Extensive studies have been made recently for development of optical recording utilizing laser as such optical recording enables high density recording of information, its storage and reproduction. A typical example of the devices embodying the principle of such optical recording is optical disc. Generally, optical disc comprises basically a transparent substrate and various recording media coated thereon.

Colorless and transparent synthetic resins are favorably used for the transparent substrate of optical disc, and preferred examples of such synthetic resins are polycarbonate (hereinafter abbreviated as PC), polymethyl methacrylate (hereinafter abbreviated as PMMA) and polystyrene (hereinafter abbreviated as PSt). These resins are not only prominent in colorless transparency but also possess their own excellent properties. However, these resins do not satisfy with all the requirements for application to optical material, especially optical disc substrate, and they still have the problems to be solved. For example, PC is defective in birefringence properties due to its aromatic ring. It is also high in water absorptivity and water permeability. In PMMA, the problems relating to heat resistance, water absorptivity and toughness have been pointed out. In PSt, although satisfactory in water absorptivity and water permeability, it causes very wide birefringent index and is also poor in heat resistance.

Thus, these resins are practically used with their own technical defects left outstanding. Actually, there are noted the new technical defects such as mentioned later in relation to the recording media coated on the transparent substrates made of the said resins.

Regarding the recording media, there have been made wide-ranging researches and various types of recording media have been developed in accordance with the use of optical disc. For example, there is known a perforated-type recording media used exclusively for recording and reproduction, which are called "write once"-type recording media. Also, in the "erasable"-type recording media which are capable of recording, reproduction, erasion and re-recording, there are known a phase transition-type recording media utilizing the phenomenon of crystal phase transition and a photomagnetic-type recording media utilizing the photomagnetic effect. As for the materials for these magnetic media, there are mostly used tellurium, tellurium oxides and tellurium-based alloy compounds for the "write once"-type recording media, and amorphous alloy compounds of rare earth and transition metals such as GdFe, TbFe, GdFeCo and TbFeCo, and inorganic materials for the "erasable"-type magnetic media. Generally, these magnetic media are made by forming a film of the said material on a transparent substrate by a dry method such as sputtering under high vacuum.

High hygroscopicity and water permeability of PC and PMMA cause the technical defects. That is, high hygroscopicity of the said materials gives rise to the problem of warp of the substrate due to its expansion on moisture absorption. Also, high water permeability of the said materials gives rise to the problem that corrosion of the magnetic medium is caused by water which gets into the medium through the substrate, resulting in a reduced service life of the optical disc.

With reference to heat resistance of the resins for substrate, there exist the following technical problems. In practical use of optical discs, especially "write once"-type ones and "erasable"-type ones, the temperature of the recording medium at the time of writing of record or erasion may reach 200° C. or higher. It is therefore liable that the disc substrate will be heated to a fairly high temperature at the time of writing of record or erasion, although the heat of the recording medium may not be directly applied to the substrate, and as a consequence there may arise the problem of deformation of the substrate or the grooves in case where the resin used is low in heat resistance.

In the production process of optical discs, there is often incorporated a heat treatment step for the purpose of preventing change with the passage of time of the substrate or magnetic medium. However, for the improvement of productivity, it is desirable that the heat treatment be conducted at as high a temperature as possible to minimize the treatment time.

Use of a resin with low heat resistance makes it impossible to adapt a high treating temperature, making it unable to raise productivity.

For these reasons, PSt and PMMA which are low in heat resistance, are quite unsatisfactory for enduring high temperature in the production process of optical discs or in use thereof, and PC having high heat resistance has exclusively been studied as an available material for transparent substrate.

Use of a transparent resin with high softening point, which is principally composed of carbon and hydrogen, is known as a resin for making up for the defects of the conventional resins such as PC, PMMA and PSt. A hydrogenated vinyl aromatic hydrocarbon polymer is proposed in Japanese Patent Application Laid-Open (KOKAI) No. 318015/89.

However, this hydrogenated vinyl aromatic hydrocarbon polymer, being no exception to the inherent low adhesiveness of polyolefins, has a technical defect that it was poor in adhesion to the recording film and incapable of satisfying the requirement for long life of optical disc.

As a result of strenuous studies for improving its adhesiveness to the recording layer, it has been found that by using as a raw material of the substrate, a hydrogenated vinyl aromatic hydrocarbon polymer composition obtainable by blending a hydrogenated vinyl aromatic hydrocarbon polymer having specified hydrogenation degree and a hydrogenated vinyl aromatic hydrocarbon-conjugated diene block copolymer having specified composition ratio and hydrogenation degree an optical disc substrate having excellent adhesiveness to the recording layer while maintaining high heat resistance in which the hydrogenated vinyl aromatic hydrocarbon polymers inherently posses, can be obtained. The present invention was attained on the basis of this finding.

SUMMARY OF THE INVENTION

In a first aspect of the present invention, there is provided a hydrogenated vinyl aromatic hydrocarbon polymer composition comprising (a) 5-90% by weight of a hydrogenated vinyl aromatic hydrocarbon-conjugated diene block copolymer obtained by hydrogenating the substantially whole double bonds derived from the conjugated diene bonds and not less than 60 mol % and less than 80 mol % of double bonds of an aromatic ring, the content of the conjugated diene polymer segments in said block copolymer being 1-50 wt %, and (b) 10-95% by weight of a hydrogenated vinyl aromatic hydrocarbon polymer obtained by hydrogenating not less than 60 mol % and less than 80 mol % of double bonds of an aromatic ring.

In a second aspect of the present invention, there is provided an optical disc substrate molded from the hydrogenated vinyl aromatic hydrocarbon polymer composition of the 1st aspect.

DETAILED DESCRIPTION OF THE INVENTION

A principal component (component (a)) of the hydrogenated vinyl aromatic hydrocarbon polymer composition according to the present invention is a hydrogenated vinyl aromatic hydrocarbon-conjugated diene block copolymer.

As the vinyl aromatic hydrocarbon monomer in the vinyl aromatic hydrocarbon polymer segments in the said vinyl aromatic hydrocarbon-conjugated diene block copolymer, there can be used, for instance, styrene, p-methylstyrene, α-methylstyrene and their mixtures. Among them, styrene is preferred.

The vinyl aromatic hydrocarbon polymer segment may be constituted by a homopolymer of one of the said vinyl aromatic hydrocarbons or a copolymer of two or more of the said vinyl aromatic hydrocarbons. Other monomer(s) copolymerizable with the said vinyl aromatic hydrocarbons may be contained within limits not substantially affecting to the properties of the vinyl aromatic hydrocarbon polymer used. As such monomers, acrylic acid, acrylic ester, methacrylic acid, methacrylic ester, maleic acid, maleic anhydride, acrolein, vinyl esters, vinyl ethers, vinyl ketones and acrylonitrile may be exemplified.

As the conjugated diene monomer in the conjugated diene polymer segments, there can be used, for instance, 1,3-butadiene, isoprene, 2,3-dimethyl-1,3-butadiene, 1,3-pentadiene, 1,3-hexadiene and their mixtures. Usually, 1,3-butadiene and isoprene are preferred.

A block copolymer composed of these two types of segments can be easily obtained by a known method, so-called living anionic polymerization method, for example, a polymerization method comprising polymerizing these two types of segments in a hydrocarbon solvent such as hexane or heptane in the presence of an organolithium compound as polymerization initiator.

The content of the conjugated diene polymer segments in the said block copolymer is 1-50 wt %, preferably 5-30 wt %.

If the content of the conjugated diene polymer segments in the block copolymer exceeds 50 wt %, the composition is deteriorated in heat resistance and rigidity, and becomes unsuited for making a desired optical disc substrate. If the content thereof is less than 1 wt %, the composition is deteriorated in fluidity and toughness.

The number-average molecular weight of the said vinyl aromatic hydrocarbon-conjugated diene block copolymer is 30,000-400,000, preferably 50,000-400,000.

A hydrogenated vinyl aromatic hydrocarbon-conjugated diene block copolymer used as component (a) of the composition according to the present invention can be obtained by hydrogenating such a block copolymer described above in the presence of a hydrogenating catalyst having aromatic hydrogenating activity. As the hydrogenating catalyst, there can be used metals such as nickel, cobalt, ruthenium, rhodium, platinum, palladium, their oxides, their salts, their complexes, and those metals, their oxides, their salts or their complexes carried on a carrier such as activated carbon, diatomaceous earth, silica or alumina. Among them, Raney nickel, Raney cobalt, stabilized nickel, carbon- or alumina-carried ruthenium, rhodium or platinum, and carbon- or silica-carried palladium are preferred in view of reactivity.

The hydrogenation reaction is preferably carried out by using a saturated hydrocarbon solvent such as cyclohexane, methylcyclohexane, n-octane, decalin, tetralin, naphtha or an ether solvent such as tetrahydrofuron under a pressure of 50-250 kg/cm$^2$ at a temperature of 100°-200° C. As for the hydrogenation degree that of the double bonds derived from the conjugated diene segments is substantially whole, preferably not less than 98%, more preferably not less than 99%, most preferably 100%.

The hydrogenation degree of double bonds of the aromatic ring is not less than 60 mol % and less than 80 mol %, preferably 60-75 mol %. If the hydrogenation degree of the aromatic ring is not more than 80 mol %, adhesion to the recording medium becomes defective, giving rise to the problem on long-time durability. If the hydrogenation degree of the aromatic ring is less than 60 mol %, there arise such problems as reduction of heat resistance, increase of birefringence index and deterioration of compatibility with the component (b).

The number-average molecular weight of the thus obtained hydrogenated vinyl aromatic hydrocarbon-conjugated diene block copolymer used as component (a) is lowered during the hydrogenation process and is 20,000-300,000, preferably 50,000-200,000, more preferably 80,000-150,000. If the molecular weight is less than 20,000, the composition lacks strength, and if the molecular weight exceeds 300,000, the composition is deteriorated in moldability and optical uniformity.

Another principal component (component (b)) of the hydrogenated vinyl aromatic hydrocarbon polymer composition according to the present invention is a hydrogenated vinyl aromatic hydrocarbon polymer.

As the vinyl aromatic hydrocarbon polymer used as raw material for the said component (b), there can be empolyed the same polymers as those of the vinyl aromatic hydrocarbon polymer segments of the component (a). As the method of polymerization, any method can be used as far as it is capable of producing an amorphous polymer, and usually radical polymerization or anionic polymerization is used. The number-average molecular weight of the said vinyl aromatic hydrocarbon polymer is not less than 50,000. If it is less than 50,000, the resin obtained after hydrogenation is deteriorated in heat resistance and toughness.

The upper limit of the number-average molecular weight of the said polymer is not more than 400,000, preferably not more than 200,000.

Such a vinyl aromatic hydrocarbon polymer is subjected to aromatic ring hydrogenation in the same way as hydrogenation conducted in the preparation of the component (a) described above.

The hydrogenation degree of the double bonds of the aromatic ring in the hydrogenation reaction is not less than 60 and less than 80 mol %, preferably 60–75 mol %. If the hydrogenation degree is less than 60 mol %, heat resistance lowers and also the birefringence index of the optical material increases. If the hydrogenation degree is not less than 80 mol %, adhesion to the recording film becomes weak.

The number-average molecular weight of the thus obtained hydrogenated vinyl aromatic hydrocarbon polymer is lowered during the hydrogenation process and is 40,000–300,000, preferably 60,000–150,000.

If the number-average molecular weight is less than 40,000, the composition lacks strength, while if the number-average molecular weight exceeds 300,000, the composition is deteriorated in moldability and optical uniformity.

As for the content of each component of the composition of the present invention, the content of the component (a) is 5–90 wt %, preferably 15–50 wt % and that of the component (b) is 10–95 wt %, preferably 50–85 wt %. The content of the conjugated diene polymer segments in the composition of the present invention is 1–40 wt %, preferably 1–20 wt %, more preferably 2–10 wt %.

The method of mixing of the said components is not specified, and usually there is employed a method in which the said components are dissolved in a solvent and then coprecipitated by supplying a poor solvent or by distilling away the solvent, or a method in which the said components are subjected to melt-mixing by an extruder, Brabender plastograph or a kneading machine such as Banbury mixer. A method in which the said components are mixed with a solution and then subjected to melt-mixing is also employable.

As the solvent used in the mixing method, tetrahydrofuran, decahydronaphthalene, cyclohexane and methyl cyclohexane may be exemplified. Also as the poor solvent, methanol, ethanol, propanol and water may be exemplified.

In the present invention, the polymer composition obtained in the manner described above may be added with a hydrocarbon material having a number-average molecular weight of about 500–5,000 for the purpose of improving moldability, etc., within limits not affecting a heat resistance and an optical uniformity of the composition.

Typical examples of such hydrocarbon material are the low-molecular weight hydrocarbon polymers having a higher glass transition point than room temperature, such as hydrogenated petroleum reins, hydrogenated terpene resins and hydrogenated low-molecular weight styrene polymers, and high-boiling point hydrocarbon oils which are liquid at room temperature, such as alkylbenzene and alkylnaphthalene. The amount of the hydrocarbon material added in not more than 10 wt %, preferably 0.1–5 wt %.

In the present invention, usually a heat stabilizer is added to the obtained polymer composition and then the resultant composition is molded.

As the heat stabilizer, there can be used, for instance, hindered phenolic heat stabilizers, sulfur-based heat stabilizers and phosphorus-based heat stabilizers. Joint use of a hindered phenolic heat stabilizer and a phosphorus-based heat stabilizer is preferred for the reason of extra improvement of resistance to heat deterioration.

As the hindered phenolic heat stabilizers usable in the present invention, tetraquis[methylene-3-(3,5-di-t-butyl-4-hydroxyphenyl)propionate]methane, 3,9-bis[1,1-dimethyl-2-{β-(3-t-butyl-4-hydroxy-5-methylphenyl)-propionyloxy}ethyl]-2,4,8,10-tetraoxapyro[5,5]undecane, 1,3,5-tris(3,5-d-t-butyl-4-hydroxy-benzyl)-s-triazine-2,4,6(1H, 3H, 5H)-trione, and 1,3,5-trimethyl-2,4,6-tris(2,5-di-t-butyl-4-hydroxybenzyl)-benzene may be exemplified.

As the sulfur-based heat stabilizers usable in the present invention, tetraquis[methylene-3-(dodecylthio)propionate]methane and distearylthio dipropionate may be exemplified.

As the phosphorus-based heat stabilizers usable in the present invention, tetraquis(2,4-di-t-butylphenyl)-4,4'-biphenylene phosphonite and bis(2,6-di-t-butyl-4-methylphenyl)pentaerythritol-di-phosphite may be exemplified.

The content of the heat stabilizer in the polymer composition is 0.01–1% by weight, preferably 0.05–0.5% by weight.

Also, it is preferable for suppressing the generation of foreign matter on the surface of the disc substrate that a metal salt of long-chain fatty acid is jointly used as an additive with the heat stabilizer.

As the metal salt of long-chain fatty acid usable in the present invention, one represented by the following formula may be exemplified.

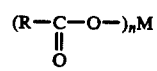

(wherein R represents an alkyl group having 12 to 30 carbon atoms, M represents divalent or trivalent metal ion and n represents 1, 2 or 3, which corresponds to valence number)

As the long-chain fatty acid, lauric acid, myristic acid, palmitic acid, stearic acid and behenic acid are preferred, and stearic acid is more preferred.

As the metal ion, Mg ion, Ca ion, Zn ion, Pd ion, Sr ion and Al ion are preferred, Ca ion and Zn ion are more preferred, and Zn is most preferred.

The content of the additive in the polymer composition is not more than 1% by weight, preferably 0.01–0.5% by weight.

The method of mixing the polymer composition of the present invention with the heat stabilizer and additive is not specified, but usually the polymer composition, heat stabilizer and additive are first mixed by a suitable mixer such as ribbon blender, tumble blender, Henschel mixer and then the resultant mixture is melt-kneaded and formed into pellets by using a Banbury mixer, single-screw extruder, double-screw extruder or other suitable means. The thus obtained pellets are subjected to injection molding at a temperature of 270°–350° C., preferably 280°–310° C., thereby obtaining an optical disc substrate which is excellent in transparency and heat resistance, free of tinting and very small in optical distortion.

The optical disc substrate of the present invention thus obtained is small in birefringence index, the values thereof measured at different portions in the said substrate being not more than 45 nm, preferably not more than 40 nm. Light transmittance of the said substrate is not lower than 85%, preferably not lower than 90%.

For producing an optical disc by using an optical disc substrate obtained from a hydrogenated vinyl aromatic hydrocarbon polymer composition of the present invention, a method in which a coating film of SiNx, TaOx or other suitable material is formed on the surface of the said substrate by sputtering, deposition or other means, then a recording layer of TbFeCo or other suitable material is formed on the said coating film and finally the thus-formed laminate is covered with a protective film, can be employed.

In the following peel test, checkered test pieces (1 mm × 1 mm) of not more than 5 in the 100 test pieces, which are peeled off with the tape, are required. None of the 100 checkered test pieces (1 mm × 1 mm), which is peeled off with the tape, is preferred for a practical use.

The coating films are formed on the substrate obtained from the hydrogenated vinyl aromatic hydrocarbon polymer composition according to the present invention. Lines are drawn at a rate of 10 lines per area of 1 cm × 1 cm at the part constituting the specular surface of the substrate provided with the said coating films, and an adhesive tape (imide film base, made by Teraoka Co., Ltd.) is pasted on the checkered portion of the substrate. Adhesive strength between the substrate and the coating film is evaluated by peeling off the tape (peel test).

Since the optical disc substrate made from a polymer composition of the present invention is excellent in adhesion to the recording medium, a long service life of the optical disc is secured. Also, as the optical disc substrate according to the present invention is small in birefringence index, it is suited for use as optical disc substrate and other optical materials.

The polymer composition of the present invention, owing to its excellent heat resistance and optical properties, finds use as a molding material for various optical articles such as optical lens, optical cards, etc., in addition to optical discs described above. In these uses, excellent adhesiveness of the polymer composition of the present invention proves advantageous.

EXAMPLES

The present invention will hereinafter be described in further detail by showing the examples thereof and comparative examples. It is to be understood, however, that the present invention is in no way defined in its scope by these examples but can be embodied otherwise as well without departing from the scope and spirit of the invention.

The various properties referred to in the following Examples and Comparative Examples were determined by the methods described below.

(1) Number-average molecular weight:

This was measured by gel permeation chromatograph (GPC) using tetrahydrofuran (THF) as solvent in the same way as when using polystyrene, and the number-average molecular weight calculated as the polystyrene basis was determined.

(2) Aromatic ring hydrogenation degree (%):

A polyvinylcyclohexane-type resin was dissolved in tetrahydrofuran, and the aromatic ring hydrogenation degree was determined by UV absorption.

(3) Glass transition point (°C.):

Measured by using a differential scanning calorimeter Model 9900 mfd. by E. I. Du Pont de Neymours & Co.

(4) High-temperature, high-humidity test:

An optical disc substrate having a recording medium was placed in a thermo-humidistat maintained at 85° C. and 85% RH, and after keeping in the thermo-humidistat for 200 hours, adhesion of the recording film was evaluated.

(5) Birefringence index:

Determined by using a condensing birefringent meter ELP-300AFB mfd. by Mizojiri Optical Industries Co., Ltd.

RESIN PREPARATION EXAMPLE 1

A styrene homopolymer (HH-102 produced by Mitsubishi Monsanto Chemical Co., Ltd., Number-average molecular weight ($\overline{Mn}$): 100,000) was dissolved in tetrahydrofuran, and the resultant solution was added with 5% Pd/SiO$_2$ as catalyst and subjected to hydrogenation reaction at 170° C. under hydrogen pressure of 100 kg/cm$^2$ for 6 hours to obtain hydrogenated polystyrene having a number-average molecular weight of 90,000 and an aromatic-ring hydrogenation degree of 70.0%.

RESIN PREPARATION EXAMPLE 2

A styrene-butadiene block copolymer ($\overline{Mn}$: 100,000, butadiene content: 15 wt %) obtained by anionic polymerization was hydrogenated according to the same method as the above-described Resin Preparation Example 1, except that the hydrogen pressure was 70 kg/cm$^2$ to obtain a hydrogenated styrene-butadiene block copolymer having a number-average molecular weight of 95,000, and a hydrogenation degree of double bonds derived from the conjugated diene bonds of 100% and an aromatic-ring hydrogenation degree of 73.0%.

RESIN PREPARATION EXAMPLE 3

A styrene homopolymer ($\overline{Mn}$: 60,000) was dissolved in tetrahydrofuran and the resultant solution was added with 5% Pd/SiO$_2$ as catalyst and subjected to hydrogenation reaction at 170° C. for 4 hours under hydrogen pressure of 95 kg/cm$^2$ to obtain hydrogenated poylstyrene having a number-average molecular weight of 51,000, and an aromatic-ring hydrogenation degree of 79%.

RESIN PREPARATION EXAMPLE 4

A styrene-butadiene block copolymer ($\overline{Mn}$: 125,000, butadiene content: 20 wt %) was hydrogenated in the same way as Resin Preparation Example 2 to obtain a hydrogenated styrene-butadiene block copolymer having a number-average molecular weight of 106,000, and a hydrogenation degree of double bonds derived from the conjugated diene bonds of 100% and an aromatic-ring hydrogenation degree of 72.0%.

RESIN PREPARATION EXAMPLE 5

The same styrene homopolymer as Resin Preparation Example 1 was hydrogenated in same procedure of Resin Preparation Example 1 except for the hydrogenation time of 8 hours to obtain a hydrogenated polystyrene having a number-average molecular weight of 75,000 and an aromatic-ring hydrogenation degree of 99%.

RESIN PREPARATION EXAMPLE 6

The same styrene homopolymer as Resin Preparation Example 1 was hydrogenated in same procedure of Resin Preparation Example 1 except for the hydrogenation time of 7 hours to obtain a hydrogenated polystyrene having a number-average molecular weight of 87,000 and an aromatic-ring hydrogenation degree of 85%.

RESIN PREPARATION EXAMPLE 7

The same styrene-butadiene block copolymer as Resin Preparation Example 2 was hydrogenated in same procedure of Resin Preparation Example 2 except for the hydrogenation time of 8 hours to obtain a hydrogenated styrene-butadiene block copolymer having a number-average molecular weight of 91,000, and hydrogenation degree of double bonds derived from the conjugated diene bonds of 100% and an aromatic-ring hydrogenation degree of 83%.

RESIN PREPARATION EXAMPLE 8

The same styrene homopolymer as Resin Preparation Example 1 was hydrogenated in same procedure of Resin Preparation Example 1 except for the hydrogenation time of 5 hours to obtain a hydrogenated polystyrene having a number-average molecular weight of 93,000 and an aromatic-ring hydrogenation degree of 62%.

RESIN PREPARATION EXAMPLE 9

The same styrene-butadiene block copolymer as Resin Preparation Example 2 was hydrogenated in same procedure of Resin Preparation Example 2 except for the hydrogenation time of 5 hours to obtain a hydrogenated styrene-butadiene block copolymer having a number-average molecular weight of 98,000 and hydrogenation degree of double bonds derived from the conjugated diene bonds of 100% and an aromatic-ring hydrogenation degree of 60%.

EXAMPLE 1

7.50 kg of the polymer obtained in Resin Preparation Example 1 and 5.0 kg of the polymer obtained in Resin Preparation Example 2 were dissolved in tetrahydrofuran and then coprecipitated in methanol. To the resultantly obtained wet powder were added 0.1 part by weight of 1,3,5-trimethyl-2,4,6-tris-(3,5-di-t-butyl-4-hydroxybenzyl)benzene (Irganox 1330, produced by Ciba Geigy) 0.1 part by weight of (2,6-di-t-butyl-4-methylphenyl)pentaerythritol diphosphite (MARK-PEP-36, produced by ADEKA ARGUS CHEMICAL Co., Ltd.) and 0.1 part by weight of zinc stearate, followed by drying. Then the resultant mixture was melt-kneaded at 260° C. and pelletized by using an extruder.

The thus-obtained pellets were subjected to injection molding at a resin temperature of 300° C. by using an injection molder M-140A (mfd. by Meiki Co., Ltd.) with a grooved stamper mounted to the movable platen side, to mold a disc-shaped optical disc substrate having a thickness of 1.2 mm and a diameter of 130 mm.

The glass transition temperature of the polymer composition was 131° C.

The obtained substrate was placed in a sputtering device. First, the sputter chamber was evacuated to not more than $8 \times 10^{-7}$ Torr and reactive sputtering of the Ta target was carried out by using an $Ar/O_2$ mixed gas to form an interference layer (800 Å in thickness) composed of $Ta_2O_5$. This was followed by binary simultaneous sputtering of the Tb target and FeCo target by using Ar gas to form a recording layer (300 Å in thickness) of TbFeCo. Then, the Al target having the Ti chips disposed thereon was sputtered in Ar gas to form a reflective layer (300 Å in thickness). Lines were drawn at a rate of 10 lines per area of 1 cm × 1 cm at the part constituting the specular surface of the substrate provided with the said coating films, and an adhesive tape (imide film base, made by Teraoka Co., Ltd.) was pasted on the checkered portion of the substrate. Adhesive strength between the substrate and the tantalum oxide film was evaluated by peeling off the tape (peel test). None of the 100 checkered test pieces (1 mm × 1 mm) was peeled off with the tape.

The similar adhesive strength test (peel test) was conducted after subjecting the said substrate to a high-temperature and high-humidity exposure test. In this test, too, none of the 100 checked test pieces (1 mm × 1 mm) was peeled off.

The birefringence index measured at any point in the 25–55 mm area from the center of the substrate was not more than 40 nm.

EXAMPLE 2

12.0 kg of the hydrogenated polymer obtained in Resin Preparation Example 3 and 4.0 kg of the hydrogenated polymer obtained in Resin Preparation Example 4 were treated in the same way as Example 1 for pelletization, injection molding and sputtering. The glass transition point of the polymer composition was 135° C. In the peel test, none of the 100 test pieces was peeled of either before or after the high-temperature and high-humidity exposure test.

The birefringence index measured at any point in the 25–55 mm area from the center of the substrate was not more than 40 nm.

COMPARATIVE EXAMPLE 1

To 15.0 kg of the polymer obtained in Resin Preparation Example 5 were added the same additives used in Example 1 and the resultant mixture was treated in the same way as Example 1 for pelletization, injection molding and sputtering. The glass transition point of the polymer composition was 146° C.

In the peel test, all of the 100 test pieces were peeled off.

The birefringence index measured at any point in the 25–55 mm area from the center of the substrate was not more than 40 nm.

COMPARATIVE EXAMPLE 2

To 15.0 kg of the polymer obtained in Resin Preparation Example 1 were added the same additives used in Example 1 and the resultant mixture was treated in the same way as Example 1 for pelletization, injection molding and sputtering. The glass transition point of the polymer composition was 133° C.

In the peel test, none of the test pieces was peeled off either before or after the high-temperature and high-humidity exposure test. The birefringence index measured at any point in the 25–55 mm area from the center of the substrate was 50–150 nm.

COMPARATIVE EXAMPLE 3

7.50 kg of the polymer obtained in Resin Preparation Example 6 and 5.0 kg of the polymer obtained in Resin Preparation Example 7 were dissolved in tetrahydrofuran and then coprecipitated in methanol. The resultant wet powder was treated in the same way as Example 1 for pelletization, injection molding and sputtering. The glass transition point of the polymer composition was 135° C.

In the peel test, none of the 100 test pieces was peeled off before the high-temperature and high-humidity exposure test, and 25 pieces in the 100 test pieces peeled were off after the high-temperature and high-humidity exposure test.

The birefringence index measured at any point in the 25-55 mm area from the center of the substrate was not more than 40 nm.

EXAMPLE 3

7.50 kg of the polymer obtained in Resin Preparation Example 8 and 5.0 kg of the polymer obtained in Resin Preparation Example 9 were dissolved in tetrahydrofuran and then coprecipitated in methanol. The resultant wet powder was treated in the same way as Example 1 for pelletization, injection molding and sputtering. The glass transition point of the polymer composition was 121° C. In the peel test, none of the 100 test pieces was peeled of either before or after the high-temperature and high-humidity exposure test.

The birefringence index measured at any point in the 25-55 mm area from the center of the substrate was not more than 40 nm.

What is claimed is:

1. A hydrogenated vinyl aromatic hydrocarbon polymer composition comprising:
   (a) 5-90% by weight of a hydrogenated vinyl aromatic hydrocarbon-conjugated diene block copolymer obtained by hydrogenating the substantially whole double bonds derived from the conjugated diene bonds and not less than 60 mol % and less than 80 mol % of an aromatic-ring, the content of the conjugated diene polymer segments in said block copolymer being 1-50 wt %; and
   (b) 10-95% by weight of a hydrogenated vinyl aromatic hydrocarbon polymer obtained by hydrogenating not less than 60 mol % and less than 80 mol % of an aromatic-ring.

2. A composition according to claim 1, wherein the hydrogenated vinyl aromatic hydrocarbon-conjugated diene block copolymer is 15-50% by weight and the hydrogenated vinyl aromatic hydrocarbon polymer is 50-85% by weight.

3. A composition according to claim 1, wherein the content of the conjugated diene polymer segments in the composition is 1-40 wt %.

4. A composition according to claim 1, wherein the number-average molecular weight of the hydrogenated vinyl aromatic hydrocarbon-conjugated diene block copolymer is 20,000-300,000.

5. A composition according to claim 1, wherein the number-average molecular weight of the hydrogenated vinyl aromatic hydrocarbon polymer is 40,000-300,000.

6. A composition according to claim 1, further comprising not more than 10% by weight of a hydrocarbon material having the number-average molecular weight of 500-5,000.

7. A composition according to claim 6, wherein the hydrocarbon material is a hydrogenated petroleum resin, a low-molecular weight hydrocarbon polymer having a higher glass transition point than room temperature or a high-boiling point hydrocarbon oil which is liquid at room temperature.

8. A composition according to claim 1, wherein a vinyl aromatic hydrocarbon monomer forming the vinyl aromatic hydrocarbon-conjugated diene block copolymer and the vinyl aromatic hydrocarbon polymer is styrene, p-methylstyrene, α-methylstyrene or a mixture thereof.

9. A composition according to claim 1, wherein a conjugated diene monomer forming the vinyl aromatic hydrocarbon polymer-conjugated diene block copolymer is 1,3-butadiene, isoprene, 2,3-dimethyl-1,3-butadiene, 1,3-pentadiene, 1,3-hexadiene or a mixture thereof.

10. An optical disc substrate molded from the composition of claim 1.

* * * * *